Patented Apr. 25, 1939

2,155,645

UNITED STATES PATENT OFFICE 2,155,645

SEPARATION OF WAX FROM OIL

Louis P. Evans and Howard H. Gross, Beacon, N. Y., assignors to The Texas Company, New York, N. Y., a corporation of Delaware No Drawing. Application February 24, 1937, Serial No. 127,404

5 Claims. (Cl. 196—18)

This invention relates to the separation of wax from oil.

It contemplates dewaxing wax-bearing oil with a solvent in the presence of a wax crystal modifying substance, and has particular reference to a method of employing a wax crystal modifying substance such as a metal soap of the higher fatty acids. Such metal soaps include aluminum stearate, lead stearate, magnesium stearate, magnesium palmitate, or mixtures thereof. Metal soaps of naphthenic acids may be employed, such as aluminum naphthenate and lead naphthenate.

The process of our invention comprises mixing the oil to be dewaxed with a dewaxing solvent and adding to the mixture of wax-bearing oil and solvent a concentrate formed by dissolving a metal soap which has wax crystal modifying properties in a mixture of mineral lubricating oil and solvent liquid. The resultant mixture is then chilled to precipitate the wax constituents which are removed advantageously by filtration.

The amount of metal soap required to impart the necessary modifying action upon the wax crystals is comparatively small. This amount would usually be in the proportion of about 0.1% to about 1.0% by weight of the wax-bearing oil being dewaxed. Aluminum stearate has been found to be an effective modifying substance when added in an amount around 0.25%, and usually not in excess of about 0.5% by weight of the wax-bearing oil.

The invention is particularly adapted to the dewaxing of low viscosity oils; for example, wax-bearing mineral oils having a Saybolt Universal viscosity up to about 75 seconds at 210° F. However, it is frequently of advantage to employ these modifying substances in the dewaxing of relatively more viscous oils.

A wax crystal modifying substance, such as aluminum stearate, has the ability to impart a beneficial action upon the structure of the wax crystals formed during chilling of a wax-bearing solution, in which this substance is present in comparatively small amount. The modifying action is such that the wax is precipitated in a form or condition which is conducive to rapid filtration of the cold wax-bearing mixture.

As a result, the precipitated wax is readily filtered from the cold mixture and, in addition, the resulting filter cake will be comparatively free from oil so that higher yields of dewaxed oil are obtained.

Complete realization of the effect of the added modifying substance, however, is dependent upon the conditions under which the substance is incorporated in the wax-bearing oil during the dewaxing operation.

For example, when aluminum stearate is incorporated in the wax-bearing oil, or the mixture of wax-bearing oil and dewaxing solvent, at temperatures not substantially above the temperature at which the wax-bearing oil appears just completely dissolved in the solvent, little or no benefit may be realized as a result of having the modifying substance presence.

On the other hand, it has been found that when a wax crystal modifying substance is added to the solution of wax-bearing oil and dewaxing solvent, and the resultant mixture heated to a temperature substantially above that at which the wax and oil appear to be completely dissolved in the solvent, the beneficial effect of the modifying substance is quite pronounced. For example, when dewaxing a wax-bearing distillate lubricating oil stock with a selective solvent mixture composed of about 40% methyl ethyl ketone and 60% of commercial benzol, the oil will dissolve in this solvent mixture at a temperature of around 90° to 125° F., depending upon the nature of the oil as well as upon the ratio of solvent to oil used. In the usual commercial operations, the solvent and oil are employed in the proportion of about one part of oil to around two to four parts of solvent mixture.

When a wax crystal modifying substance, such as aluminum stearate, is mixed with this solution, and the resulting mixture chilled and filtered, a filtration rate of only about two gallons of dewaxed oil per square foot of filtering surface per hour may be realized.

However, if the wax-bearing oil solution and wax crystal modifying substance is heated to a temperature in the range 140° to 175° F., or, in other words, a temperature about 15° to 50° F. above the temperature at which the wax and oil appear to be just completely dissolved in the solvent, prior to chilling and filtering, a very great increase in the filtration rate is realized. This filtration rate may be four to six times as great as that realized where the solution is not heated to this elevated temperature prior to chilling. The resulting filter cake will have a volume of two-thirds or less than that of the volume of the wax cake obtained where the heating step is omitted. In addition, a very substantial increase in the yield of dewaxed oil is realized.

Our invention involves a departure from the foregoing procedure. Instead of heating the entire solution of wax-bearing oil and dewaxing solvent to an elevated temperature prior to chilling, we contemplate forming a concentrated solution of the modifying substance in a relatively small mixture of lubricating oil and solvent, and incorporating this concentrated solution in the main body of wax-bearing oil and solvent. In this way, the main body of wax-bearing oil and dewaxing solvent need only be heated to a temperature of around 110° to 120° F.

We have found that by following this procedure, we were able to realize substantially the same results as are obtained when heating the entire mixture of wax-bearing oil, solvent and modifying substance to a temperature in the range 140° to 170° F., as above described.

We have also found that a satisfactory concentrate can be formed by mixing the wax crystal modifying substance with a comparatively small quantity of oil and dewaxing solvent, and heating this mixture with agitation to a temperature of around 140° F.

Thus, in preparing a suitable concentrate, we mix about 8% by weight of aluminum stearate with 92% of a solution consisting of equal parts of wax-bearing oil, and a selective solvent mixture comprising 33% of acetone and 67% of benzol (commercial 90% benzol). This mixture is heated with agitation to a temperature of 140° F. until complete solution occurs. Such a solution remains clear without sign of precipitation until cooled to a temperature of 125° F.

This concentrated solution while hot is then in a condition to be incorporated in the main body of wax-bearing oil and dewaxing solvent. Thus, when dewaxing a wax-bearing distillate lubricating oil stock, derived from Mid-Continent crude, and having a Saybolt Universal viscosity of around 60 seconds at 210° F., this distillate is mixed with a solvent mixture consisting of 33% acetone and 67% benzol in the proportion of about one part by volume of distillate to three parts by volume of solvent mixture.

This mixture is heated to a temperature of around 100° to 120° F. to effect complete solution of wax and oil in the solvent mixture. The hot concentrate, at a temperature of around 140° F., is then added with thorough agitation, and in the proportion of about 0.5% by weight of the total solution. When so mixed, the aluminum stearate will be present in the wax-bearing solution to the extent of about 0.20% by weight of the distillate lubricating oil stock being dewaxed.

In making up the wax crystal modifying concentrate, the lubricating oil constituent may be a portion of the wax-bearing oil to be dewaxed as above indicated. However, lubricating oil from other sources may be used. While the solvent component of the concentrated solution may be a mixture of acetone and benzol, as above mentioned, it is, of course, contemplated that other solvents may be used. For example, a mixture of methyl ethyl ketone and benzol may be used. Generally, it is desirable to employ as the solvent constituent of the concentrated solution, a portion of the dewaxing solvent mixture used in dewaxing the oil.

We have found that it is advantageous to employ a mixture of lubricating oil and solvent in forming the wax crystal modifying concentrate, since it avoids the necessity of employing comparatively high temperatures.

Aluminum stearate, for example, cannot be completely dissolved in lubricating oil alone without heating to a temperature of 200° F. or higher. In many cases, it is necessary to heat to a temperature as high as 300° F. We have found, however, that aluminum stearate will dissolve completely in a mixture of oil and solvent, as above described, when heated with agitation to the comparatively low temperature of about 140° F.

It is apparently necessary, however, to have some lubricating oil present as a constituent of the concentrate because we have found that it is impossible to form a concentrate of aluminum stearate in a mixture of acetone and benzol alone, since apparently the ketone has comparatively low solvent action upon aluminum stearate. Consequently, it is impossible to obtain a clear solution containing a reasonable concentration of aluminum stearate.

From a practical standpoint, particularly when dewaxing with a mixture of methyl ethyl ketone and benzol, it is not feasible to employ benzol alone in the formation of the concentrate. Benzol and methyl ethyl ketone boil at substantially the same temperature. Therefore, it is impractical in plant operations to fractionate a portion of the benzol from the body of dewaxing solvent and use it in forming a concentrate. On the other hand, if benzol from some other source is employed, its addition to the dewaxing system results in increasing the ratio of benzol to ketone in the dewaxing solvent mixture to a point where the solvent mixture loses the necessary selective action as between wax and oil at temperatures of 0° to —20° F.

We contemplate using our invention in selective solvent dewaxing operations in general. By selective solvent we contemplate the process of dewaxing with a solvent which has substantially complete solvent action upon both wax and oil at temperatures of around 100° to 120° F., and at temperatures of 0° F. and below has substantially complete solvent action on the liquid hydrocarbon constituents but substantially no solvent action on the solid hydrocarbon constituents of the oil.

A suitable selective solvent comprises a mixture of a wax anti-solvent liquid and a good oil solvent liquid. For example, such a solvent comprises a mixture of an aliphatic ketone and an aromatic hydrocarbon, such as benzol, toluol, etc. Other wax anti-solvent liquids may be used. Also, other oil solvent liquids may be used, such as low-boiling aliphatic ethers, ethyl ether and isopropyl ether.

Obviously, many modifications and variations of the invention, as hereinbefore set forth, may be made without departing from the spirit and scope thereof, and therefore only such limitations should be imposed as are indicated in the appended claims.

We claim:

1. The method of dewaxing a wax-bearing mineral lubricating oil which comprises dissolving the oil in a selective solvent comprising a mixture of an oil solvent and a wax anti-solvent at a temperature of around 100° to 120° F., forming a concentrated solution of a soap which has wax crystal modifying properties and which is incompletely dissolved in the oil at temperatures below about 200° F. in a mixture of lubricating oil and a separate portion of said selective solvent at a temperature of around 140° F., adding the concentrated solution in small proportion to the solution to be dewaxed, chilling the mixture to precipitate wax constituents, and removing the wax constituents so precipitated.

2. The method of dewaxing a wax-bearing mineral lubricating oil which comprises dissolving the oil in aliphatic ketone and benzol at a temperature of around 100° to 120° F. and mixed with the oil in such proportion that at temperatures of around 0° to −20° F. the solvent mixture has substantially complete solvent action upon the oil and substantially no solvent action upon the solid hydrocarbon constituents, forming a concentrated solution of a metal soap of the higher fatty acids in a mixture of lubricating oil and a separate portion of said selective solvent mixture at a temperature of around 140° F., said soap being incompletely dissolved in the oil at temperatures below about 200° F., adding the concentrated solution in small proportion to aforesaid solution of wax-bearing oil and selective solvent, chilling the mixture to precipitate wax constituents, and removing the wax constituents so precipitated.

3. The method according to claim 2 in which the metal soap is aluminum stearate.

4. The method of dewaxing wax-bearing mineral lubricating oil which comprises dissolving the oil in a selective solvent comprising a mixture of an oil solvent and a wax anti-solvent at a temperature of around 100 to 120° F., forming a concentrated solution of a polyvalent metal soap of a relatively high molecular weight carboxylic acid, which has wax crystal modifying properties and which is incompletely dissolved in the oil at temperatures below about 200° F., in a mixture of lubricating oil and a separate portion of said selective solvent at a temperature of around 140° F., adding the concentrated solution in small proportion to the solution to be dewaxed, chilling the mixture to precipitate wax constituents and removing the wax constituents so precipitated.

5. The method according to claim 4 in which the soap is a polyvalent soap of a carboxylic acid containing around 16 to 20 carbon atoms.

LOUIS P. EVANS.
HOWARD H. GROSS.